United States Patent [19]
Fischer

[11] Patent Number: 5,895,985
[45] Date of Patent: Apr. 20, 1999

[54] SWITCH REMOTING SYSTEM

[76] Inventor: George Fischer, 1647 Larkfield Ave., Westlake Village, Calif. 91362

[21] Appl. No.: 08/974,355

[22] Filed: Nov. 19, 1997

[51] Int. Cl.⁶ ..................................... H01H 35/00
[52] U.S. Cl. ....................... 307/116; 307/114; 307/34; 307/40
[58] Field of Search ................. 307/116, 114, 307/34, 40; 340/310.01, 310.06

[56] References Cited

U.S. PATENT DOCUMENTS 4,024,528  5/1977  Boggs et al. ........................ 340/310

*Primary Examiner*—Jeffrey Gaffin
*Assistant Examiner*—Ed Garlepp
*Attorney, Agent, or Firm*—Kenneth W. Float

[57] ABSTRACT

A switch remoting system for extending the function of an existing wired switch in a residence or other building, so that, in its extended function, the switch controls AC power available at one or more additional AC outlets. The basic system comprises two plug-in modules including a control unit and a remote switching unit. The control unit is plugged into an AC outlet controlled by the switch whose function is being extended. When that switch is actuated, the AC power transition and the resulting "on" or "off" power state is sensed and corresponding encoded switching control signals are generated and relayed to the remote switching unit. There, the switching control signals are decoded, and actuate an internal AC switch that controls AC power to an integral AC outlet receptacle in the remote switching unit. A lamp or other device plugged into the AC receptacle of the remote switching unit is thereby switch controlled by action of the switch whose function is being extended.

16 Claims, 3 Drawing Sheets

SWITCH REMOTING SYSTEM

BACKGROUND

The present invention relates generally to electrical switches, and more particularly, to a remote switching system that permits remote turn-on and turn-off of an electrical outlet using existing conventional wall switches.

This invention is intended to be used with the electrical wiring system of a residence or other building. In particular, it is the purpose of this invention to provide a means, without any wiring change, for extending the function of an already existing switch, such as a wall switch, to the new function of switching the electrical power available at one or more additional already existing electrical outlets.

In the electrical system of a residence or other building, (e.g., 120 or 220 volt AC), the electrical wiring of that system is relatively permanent in that any significant functional change to that wiring system typically entails access through wall surfaces to the wiring and oftentimes access above the ceiling or below the floor in order to perform rerouting of the wiring. A frequent need for such a wiring change is to extend the function of an existing wall switch (or equivalent switching device) so that, in its new function, it switches electrical power at one or more additional existing electrical outlets. The wiring rerouting entailed in such a change is a significant undertaking.

U.S. Pat. No. 4,200,862 discloses a remote AC power control system. Its basic system configuration includes a control unit, and a companion plug-in remote receiving unit. That system is not intended to extend the function of an existing AC switch. Instead, its purpose is to provide a separate control unit having one or more integral push buttons to control the AC power available from a switched AC outlet integral to the companion plug-in remote receiving unit.

The control unit of this system incorporates one or more user-selectable push (selector) buttons, and, in one embodiment, the control unit incorporates an AC power cord that is plugged into a convenient AC outlet. The remote receiving unit is plugged into an AC outlet where remotely controlled switched AC power is desired. Incorporated into that remote receiving unit is an integral switched AC outlet receptacle into which a lamp or other device can be plugged. In this control unit, encoded switching control signals generated therein are relayed as a modulated carrier frequency via the AC power line to the companion remote receiving unit for control of AC power available from that remote receiving unit's integral AC outlet receptacle.

This system also includes a variant wherein the control unit is battery-powered from an internal battery, and therefore is highly portable. That version of the control unit utilizes a low power transmitter to relay encoded switching control signals to an auxiliary relay unit. The auxiliary relay unit serves an intermediate function, as will be described below.

When one of the buttons on the battery-powered control unit is user-actuated, a corresponding encoded switching control signal is generated and transmitted by its internal low power RF transmitter to the auxiliary relay unit. That auxiliary unit is also plugged into another AC outlet and receives and demodulates the encoded switching control signals. These demodulated signals are then remodulated onto a lower frequency carrier and relayed over the AC power line on to a remote receiving unit. That auxiliary relay unit also incorporates an integral switched AC outlet receptacle responsive to the switching control signals received from the control unit.

All of these units provide user-selection (unit code selection) of the detail of the encoding of the switching control signals thereby circumventing interference with other nearby units. Encoding detail is also changed to prevent ambiguity in the switch-on and switch-off control signals sent to the remote switching unit. In some versions of this system, means are also included for dimming (as well as switching) a lamp plugged into the integral switched AC outlet of the remote receiving unit.

Another variant of the above-described AC power control system uses a control unit of the type described above to remotely switch the AC power at an existing already switched AC outlet. This variant circumvents the need for a plug-in remote receiving unit at that AC outlet. Instead, in this system variant, the wall switch of an existing AC outlet is removed and replaced by a new switching device that incorporates its own switch to replace the one that is removed. The new switching device responds to switching control signals relayed over the AC line from the control unit and switches power to the wired switched AC outlet. The switch built into the new switching device can also be used to turn on or off the AC outlet the same as before the change.

Although the latter system variant provides an additional means for controlling the AC power to an existing already wired AC outlet, it requires removal and disconnection of the AC wiring to the existing switch, replacing that switch with the new switch-mounted switching device having its own switch, and reconnecting the AC wiring thereto.

U.S. Pat. Nos. 5,239,205 and 5,340,954 also disclose a system for providing a remote AC power switching function. It is a two-unit system in which one unit includes a separate switch control unit incorporating its own toggle switch. Its companion remote switching unit is plugged into a remote AC outlet, and incorporates an integral switched AC outlet receptacle into which a lamp or other device to be switched is plugged. Switching control signals in the form of a short-duration modulated RF carrier are transmitted from the switch control unit via a low power wireless RF link to the remote switching unit. Internal battery power is utilized to supply the circuits in the switch control unit.

The toggle switch on the switch control unit has a single set of momentary contacts that close only at the center of each switch transition from one end position to the other. Closure of the momentary contacts initiates the transmission of a switching control signal in the form of a short-duration modulated RF carrier over the RF link.

In one embodiment, the companion remote switching unit is plugged into an existing AC outlet and has incorporated therein an integral switched AC outlet receptacle into which can be plugged a lamp to be switch controlled. In that remote switching unit, an RF receiver is utilized to detect and demodulate the RF burst comprising the switching control signals. Each receipt of that switching control signal toggles between an "on" and "off" state the AC power to its integral switched AC outlet receptacle. In another embodiment of that system, the remote switching unit is configured to screw into a lamp socket and incorporates an integral socket to accommodate the lamp bulb.

As disclosed in U.S. Pat. Nos. 5,239,205 and 5,340,954, modulation frequencies and carrier frequencies utilized for relaying the switching control signals between the switch control unit and the remote switching unit are set at manufacture. Therefore, if more than one switch control unit and remote switching unit pair is to be operated nearby to another pair, it is necessary to select each pair so that their modulation and/or carrier frequencies do not duplicate and thereby interfere with those of another pair.

Also, as disclosed in U.S. Pat. Nos. 5,239,205 and 5,340,954, an identical switching control signal is transmitted to the companion remote switching unit for the "switch on" and "switch off" commands, and a delay of a minimum of 1 second must lapse after the switch is toggled before the switch is toggled again, otherwise the system will not operate properly, i.e., the system can become "out of synch" so that the end positions of the switch toggle may become reversed in function. Because of this limitation, the switch toggle position does not provide a sure indication of whether AC power is on or off at the outlet receptacle of the remote switching unit.

Accordingly, it is an objective of the present invention to provide for a remote switching system that permits remote turn-on and turn-off of an electrical outlet using existing conventional wall switches, and that overcome the limitations of the above-described conventional systems.

SUMMARY OF THE INVENTION

To accomplish the above and other objectives, the present invention provides for a switch remoting system that extends the capability of an existing switch, such as a wall switch or equivalent switching device, whose normal function is to control an existing alternating current (AC) outlet. In its new extended function the existing switch controls the switching of AC power available at one or more selected remote electrical outlets.

The basic system of the present invention comprises two plug-in units: a control unit that is plugged into an AC outlet box having a switched AC receptacle controlled by the existing switch whose function is extended, and a companion remote switching unit that is plugged into a remote AC outlet receptacle where switching of the AC power is desired. Incorporated into that remote switching unit is an integral switched AC outlet receptacle into which a lamp or other device can be plugged that is to be controlled by the existing switch.

When the existing switch whose function is extended is actuated, it selectively energizes or de-energizes the AC outlet receptacle to which it is wired. In response to a transition and the on-off state of the AC power at that switched AC outlet, the control unit that is plugged into that outlet generates encoded switching control signals and modulates them onto a carrier frequency for relay to the companion remote switching unit. At the remote switching unit, they are received and decoded to actuate the switching of AC power to its built-in AC outlet receptacle. Thus, by the cooperative functions of the two plug-in units (the control unit and the remote switching unit), the capability of the existing, already wired, AC switch is extended (without re-wiring) to provide switching control of the AC power available at a remote AC outlet.

Details of the encoding format utilized to relay switching control signals from the control unit to the remote switching unit are automatically changed when sending a "switch on" or "switch off" switching control signal so as to prevent any ambiguity in the relayed switching commands to the remote switching unit. User-selection of a unit code, i.e., selection of code detail of the encoded signals utilized to relay switching control signals to the remote switching unit, is provided to circumvent interference with nearby units.

Two alternative embodiments of the control unit used in the present system are provided. In the first embodiment, the control unit is configured for plugging into both the switched and the closely adjacent unswitched AC receptacle located in the same electrical outlet box. At the instant when the switch whose function is being extended is toggled on or off, the control unit circuits sense the transition and the resulting end-state of the AC power at the switched AC outlet receptacle. In response, the circuits in the control unit generate the appropriate switching control signals for relay to the remote switching unit. At the remote switching unit, those switching control signals are decoded and serve to actuate an internal AC switch supplying power to an integral AC outlet receptacle into which a lamp or other device can be plugged.

In the first embodiment of the control unit, the adjacent unswitched AC receptacle into which the unit is also plugged serves to provide power for the circuits of the control unit, and to provide an uninterruptable AC power line over which to relay the modulated carrier frequency switching control signals from the control unit to the remote switching unit. A variant of the first embodiment utilizes a low power RF transmitter in the control unit and relays the switching control signals over a wireless RF link instead of as a modulated carrier on the unswitched AC line.

A second embodiment of the invention also utilizes the switched AC receptacle to sense the switch "power-on" or "power-off" status for use by the circuits of the remote switching unit. However, in this alternative embodiment, the control unit is not plugged into the unswitched AC outlet receptacle. In the second embodiment, the encoded switching control signals are relayed as modulation on a low power radio frequency (RF) carrier and transmitted wirelessly to receiver circuits in the remote switching unit.

In the second embodiment, when the switch, such as a wall switch, whose function is being extended is turned on, power to operate the control unit circuits and to transmit the switch-on switching control signal is derived from the AC power available at the switched AC receptacle. At the instant that the switch is turned off, short-term power to energize and transmit the "switch off" switching control signal is provided to the circuits in the control unit from energy stored in a capacitor internal to that unit.

Accordingly, it is an object of this invention to provide a means for extending the function of an existing wall switch (or its equivalent) in a residence or other building, without the necessity for rewiring, so that, in its extended function, the existing wall switch switches AC power available at one or more additional remote AC electrical outlets. Those remote outlets can be in the same room, in another room, or in a nearby building.

It is another object of the present invention to provide a means whereby the function of two or more existing wall switches (or equivalent switching devices) can additionally switch control AC power at one or more additional AC electrical outlets.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

By way of introduction, the present invention is a switch remoting system that extends the function of an existing switch that is part of an existing alternating current (AC) wiring system, so that, without requiring a wiring change, that switch additionally controls AC power available at one or more selected remote AC outlets. In its basic configuration, the system includes two plug-in modules, and it may be readily used with the AC wiring system of a residence or other structure.

Figure 1:
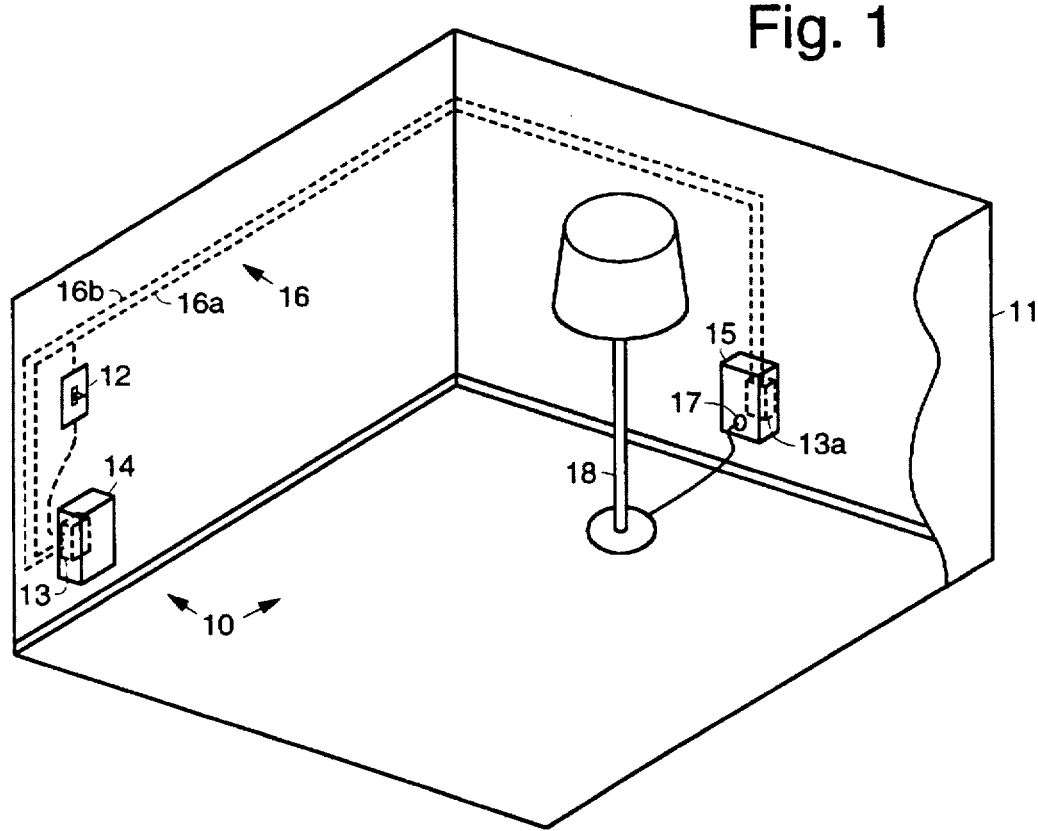
FIG. 1 is an illustrative pictorial view of a typical installation of a switch remoting system in accordance with the principles of the present invention.

Referring now to FIG. 1, it shows in pictorial form an example residence room 11 wherein an existing wall switch 12 controls AC power to a nearby wall AC electrical outlet 13 (shown in dashed lines) that is disposed in a wall of the room 11, and with which the present switch remoting system 10 is used. The switch remoting system 10 comprises a control unit 14 that is plugged into the AC electrical outlet 13. Across the room 11, a remote switching unit 15 is plugged into a remote AC electrical outlet 13a (shown in dashed lines) that is disposed in another wall of the room 11. The AC electrical outlet 13 is shown interconnected by means of conventional in-wall AC power lines 16 (comprising switched and unswitched lines 16a, 16b shown in FIG. 2) to the remote AC electrical outlet 13a, which is normal practice in residential electrical wiring schemes. A lamp 18 that is to be remotely controlled (switched on and off) is plugged into an integral internally switched AC outlet 17 of the remote switching unit 15.

In response to a switching transition and the resulting (on-off) state of the AC power at the AC electrical outlet receptacle 13 controlled by the wall switch 12, an encoded switching control signal is generated in the control unit 14. The encoded switching control signal is relayed to the remote switching unit 15. The relayed switching control signal is decoded in the remote switching unit 15 and is utilized therein to actuate an internal switch 19 (FIG. 2) that turns on or off power available at its integral switched AC outlet 17. In FIG. 1, the lamp 18 is shown plugged into that integral switched AC outlet 17. Thus, the combined action of the two cooperative modules of the system 10, namely the control unit 14 and the remote switching unit 15, cooperate to extend the switching function of the wall switch 12 so that it also controls the power available from the integral switched AC outlet 17 of the remote switching unit 15.

Two embodiments of the control unit 14 of the present invention are described below. In the first embodiment of the control unit 14, the switched and the unswitched AC receptacles 21a, 21b (FIG. 2) of the AC electrical outlet 13 are both utilized. The switched AC receptacle 21a of that AC electrical outlet 13 is controlled by the wall switch 12. The details of this embodiment are discussed in further detail below. The second embodiment of the control unit 14 utilizes only the switched AC receptacle 21a of the AC electrical outlet 13. A second difference between the two embodiments of the control unit 14 lies in the source of circuit power when the wall switch 12 whose function is being extended is turned off, which will be described in more detail below.

Figure 6:
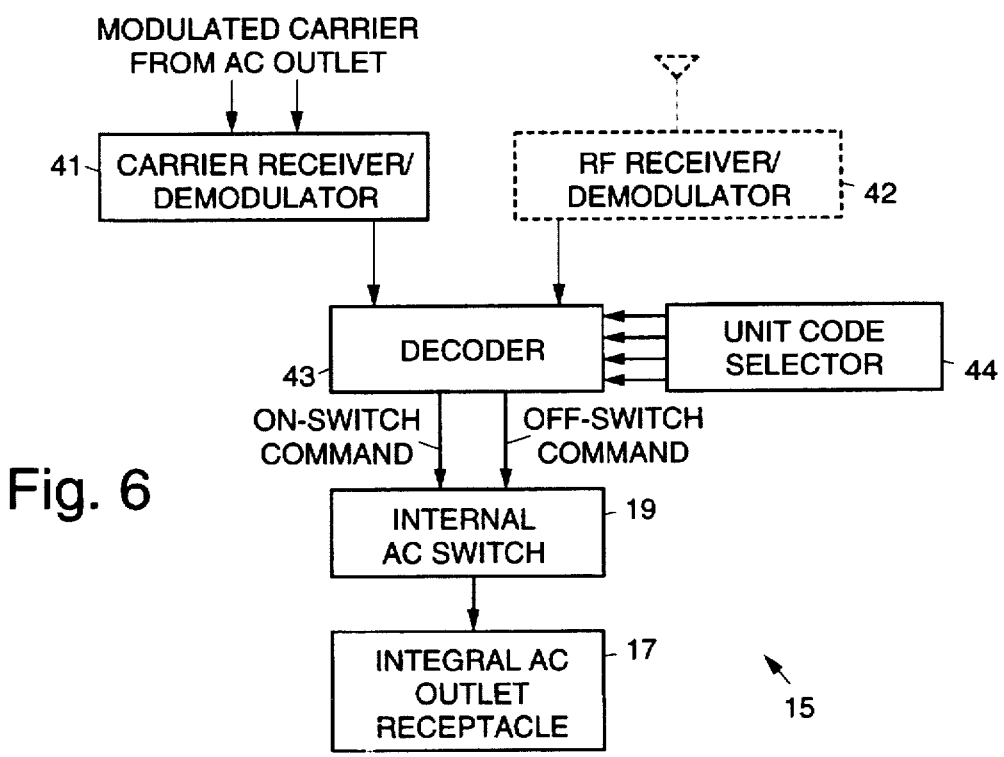
FIG. 6 is a functional block diagram of a remote switching unit of the switch remoting system.

The remote switching unit 15 used with both embodiments of the control unit 14 has two minor variants which relate only to the means for receiving the encoded switching control signals from the control unit 14. Specifically, in one variant of the remote switching unit 15, the switching control signals are extracted as a modulated carrier superimposed onto the AC power lines 16, and, in the other variant, the switching control signals are received wirelessly by an integral RF receiver 42 (FIG. 6). The encoding of the switching control signals is user-selectable in the form of a "unit code" so that interference from other nearby remote switching units 15 can be prevented.

Figure 2:
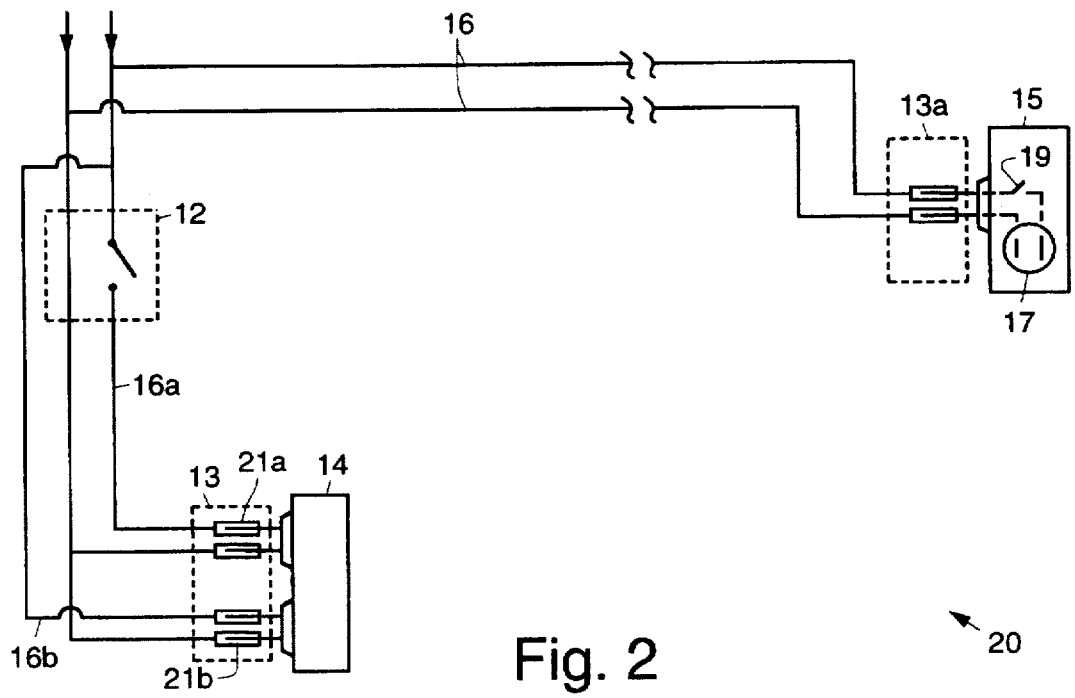
FIG. 2 is a schematic of a portion of a residence wiring layout showing installation of modules used in a first embodiment of the switch remoting system.

Referring now to FIG. 2, it shows a partial schematic of a residence wiring system 20, and the switch remoting system 10 includes the first embodiment of the control unit 14, and the remote switching unit 15. The control unit 14 is plugged into the switched AC receptacle 21a of the AC electrical outlet 13, and also into the unswitched AC receptacle 21b located closely adjacent to the switched AC receptacle 21a in the AC electrical outlet 13. Rectified and filtered power to operate circuits of the control unit 14 is derived from the unswitched AC receptacle 21b of the AC electrical outlet 13.

Whenever the wall switch 12 whose function is being extended is actuated, the control unit 14 senses the transition and the resulting "on" or "off" state of the power from the switched AC receptacle 21a of the AC electrical outlet 13. In response thereto, the control unit 14 generates an unambiguous encoded switching control signal for relay to its companion remote switching unit 15. In the first embodiment of the control unit 14, the switching control signals may be relayed to the remote switching unit 15 either by way of the unswitched AC line 16b, or by way of an RF link. The remote switching unit 15 is plugged into the remote AC electrical outlet 13a. The remote switching unit 15 decodes the switching control signals and correspondingly turns on or off the internal AC switch 19 that controls power to its integral switched AC outlet 17.

Figure 3:
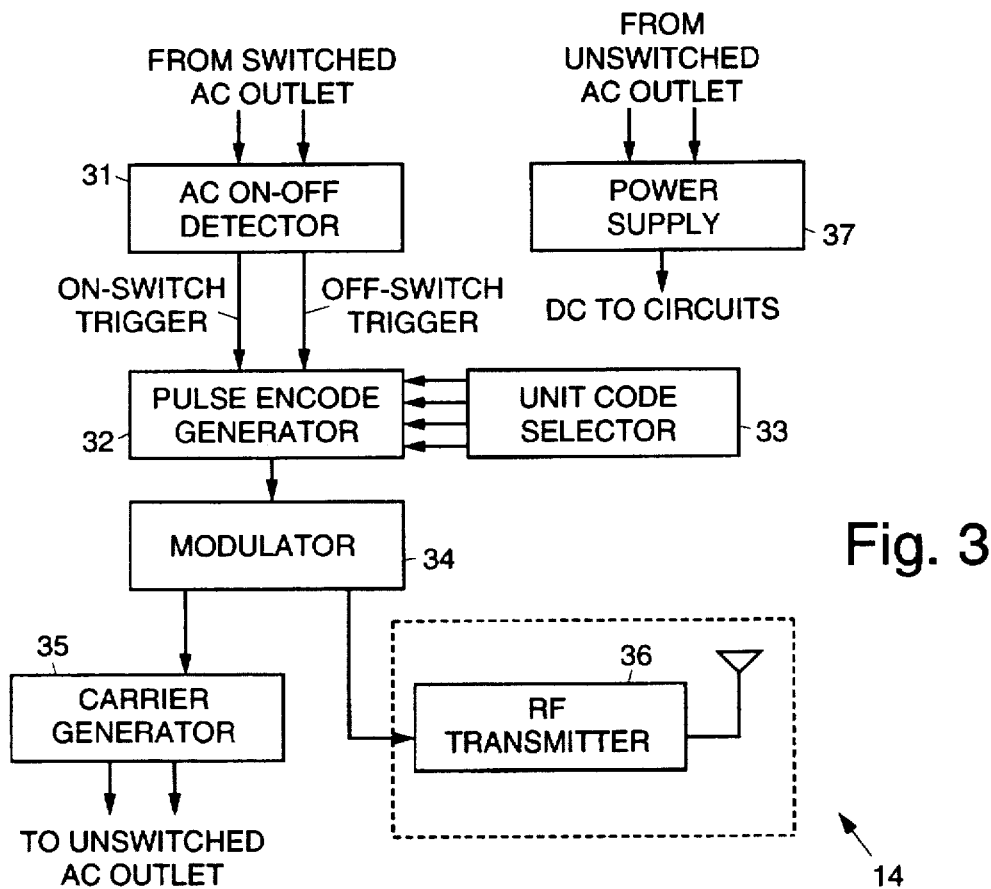
FIG. 3 is a functional block diagram of a control unit in the first embodiment of the switch remoting system.

FIG. 3 shows a functional block diagram of the control unit 14 of the first embodiment. The AC on-off detector 31 senses the switching transition and the resulting (on-off) state of the AC power from the switched AC receptacle 21a (FIG. 2). The AC on-off detector 31 then generates an appropriate "on-switch trigger" or "off-switch trigger" and feeds it to a pulse encode generator 32. The encoding detail is automatically changed depending on whether an "on-switch" or "off-switch" trigger is supplied from the AC on-off detector 31. The detail of that code is further controlled by switch settings of a unit code selector 33.

The encoded switching control signals generated in a pulse encode generator 32 are fed to a modulator 34 and in turn to a carrier generator 35 for relay by way of the unswitched AC line 16b (FIG. 2) into which the control unit 14 is also plugged. A variant (shown in dashed lines) is to feed the output of the modulator 34 to a low power RF transmitter 36 which is part of the RF link for wireless relay to the remote switching unit 15 (FIG. 2).

DC power for circuits of the control unit 14 is derived in a power supply 37 from the alternating current available from the unswitched AC receptacle 21b (FIG. 2) into which the control unit 14 is plugged. The functions in the power supply 37 are conventional, i.e., voltage drop, rectification, and filtering, and will not be discussed herein.

Figure 4:
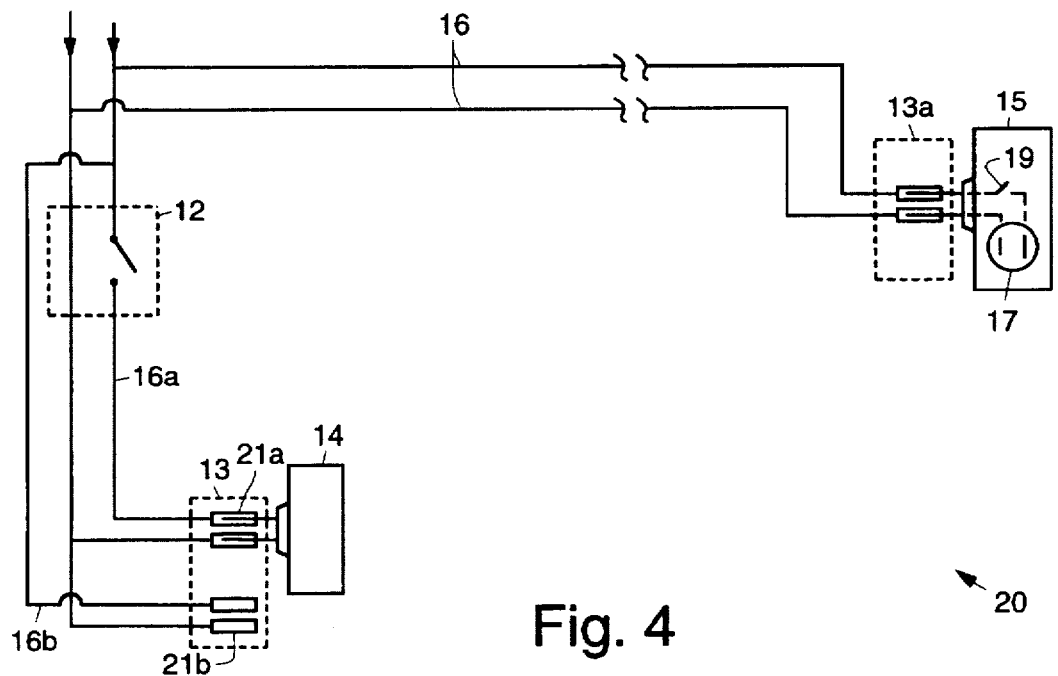
FIG. 4 is a schematic of a portion of a residence wiring layout showing the installation of modules used in a second embodiment of the switch remoting system in accordance with the principles of the present invention.

FIG. 4 shows a partial schematic of a residence wiring system 20, and the switch remoting system 10 includes a second embodiment of the control unit 14, and a remote switching unit 15. In the second embodiment, the control unit 14 is plugged only into the switched AC receptacle 21a of the AC electrical outlet 13. The AC power to the AC electrical outlet 13 is controlled by the wall switch 12. The unswitched AC receptacle 21b is not used in this embodiment. Although FIG. 4 shows an unswitched AC receptacle 21b in the AC electrical outlet 13, that receptacle 21b can either be unswitched or switched since it is not used with this embodiment of the control unit 14.

The remote switching unit 15 plugged into the remote AC electrical outlet 13a receives and decodes the switching control signals received from the control unit 14. The circuits of the remote switching unit 15 interpret detail of the encoding to unambiguously identify whether the relayed switching control signal is a "switch-on" or "switch-off" command. In response to each decoded switching control signal, the internal switch 19 is actuated in the remote switching unit 15 to turn on or turn off power to the integral AC outlet 17.

In the second embodiment, since the unswitched AC line 16b is not utilized, the encoded control signals are relayed to the remote switching unit 15 wirelessly by way of the low power RF transmitter 36 (FIG. 3) in the control unit 14. An advantage of the second embodiment is that the control unit 14 does not require access to the unswitched AC receptacle 21b in the AC electrical outlet 13.

Figure 5:
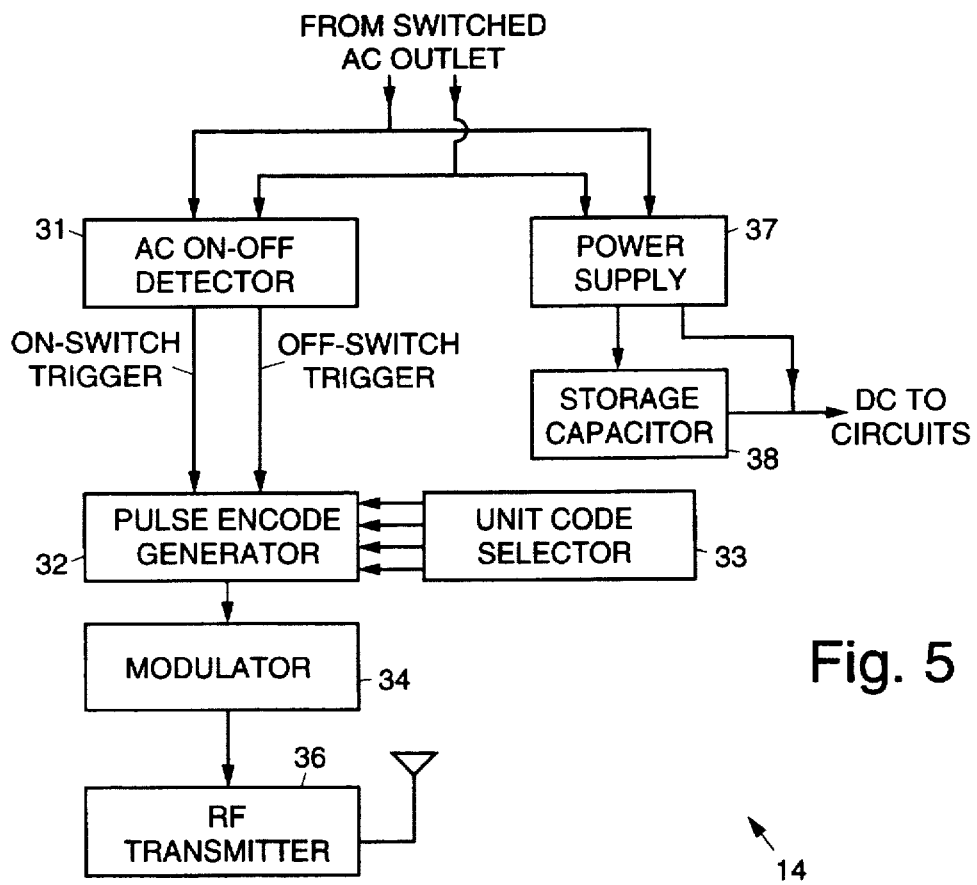
FIG. 5 is a functional block diagram of the control unit used in the second embodiment of the switch remoting system.

Referring to FIG. 5, it shows a functional block diagram of the second embodiment of the control unit 14. Many of the functions in this second embodiment of the control unit 14 are identical to those of the first embodiment, except as described below.

The AC on-off detector 31 (as in the first embodiment of the control unit 14) generates an appropriate "on-switch trigger" or "off-switch trigger" in response to a switching transition and the resulting (on-off) state of the AC power received from the switched AC receptacle 21a (FIG. 4) controlled by the switch 12 whose function is being extended. That trigger is sent to the pulse encode generator 32. The encoding detail generated in the pulse encode generator 32 is automatically changed, depending on whether an "on-switch" or "off-switch" trigger is supplied from the AC on-off detector 31. The detail of that code is further controlled by the switch settings of a unit code selector 33.

The encoded switching control signals generated in the pulse encode generator 32 are fed to a modulator 34, and from there to a low power RF transmitter 36 for wireless relay to the remote switching unit 15. This wireless RF link is required in this embodiment because the unswitched AC line 16b (FIG. 4) is not used by the control unit 14.

As shown in FIG. 5, in the second embodiment of the control unit 14, when the wall switch 12 is turned on, DC power for the circuits of the control unit 14 is derived in the power supply 37, which, in this embodiment, is fed by power from the switched AC receptacle 21a (FIG. 4). The functions in the power supply 37 are conventional, i.e., voltage drop, rectification, and filtering. While that wall switch 12 is turned on, the DC power from the power supply 37 also maintains a storage capacitor 38 in a fully charged condition. However, at the instant that the wall switch 12 is turned off, for the short duration interval required to generate and relay the "off-switch" switching control signal, circuit power is supplied from energy stored in the storage capacitor 38.

It is to be understood that the principal functions of the control unit 14 described above in both embodiments may be performed by a microprocessor or microcontroller integrated therein, for example.

FIG. 6 shows a functional block diagram of the remote switching unit 15 used with both embodiments of the control unit 14 of the system 10. Tracing the functions depicted in FIG. 6, the encoded switching signals from the control unit 14 are received either by way of the AC line 16, or in a variant implementation (shown in dashed lines), by way of a wireless link. The switching control signals are detected and demodulated in either a carrier receiver/demodulator 41, or in an RF receiver/demodulator 42. In either case, the demodulated signals are fed to a decoder 43 for decoding and generation of either an "on-switch command" or "off-switch command", depending upon the code detail of the received encoded switching control signal that is received. The unit code is selected in the unit code selector 44 to match that set in the control unit 14 with which it cooperates.

The appropriate "on-switch command" or "off-switch command" is fed to the internal AC switch 19 to turn on or turn off AC power fed on to the integral switched AC outlet 17 of the remote switching unit 15. Thus, the power available at the integral switched AC outlet 17 is controlled by the actuation and on-off state of the wall switch 12 whose function is being extended. It is to be understood that the principal functions of the remote switching unit 15 described above may be performed by a microprocessor or microcontroller integrated therein, for example.

User-selection of the unit code detail of the switching control signals permits a single control unit 14 to operate several remote switching units 15. Correspondingly, two or more control units 14 can operate one or more remote switching units 15.

Thus, systems that permit remote turn-on and turn-off of an electrical outlet using existing conventional wall switches have been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A system for extending the function of an electrical switch wired to control an alternating current (AC) switched outlet receptacle so that, in its extended function, the switch controls AC power available at one or more remote AC electrical outlets, said system comprising:

a plug-in control unit disposed in the switched AC outlet receptacle for monitoring each power transition and resulting on-off state of the AC power controlled by the switch whose function is being extended, and wherein the control unit comprises means for generating correspondingly encoded switching control signals and relaying them to a companion plug-in remote switching unit;

and wherein the companion remote switching unit comprises means for receiving and decoding relayed switching control signals, and in response thereto, energizing and de-energizing power available at an integral AC outlet receptacle into which a switchable device can be plugged.

2. The system of claim 1 wherein in the control unit, the detail of the encoding of the switching control signals is automatically changed to unambiguously indicate to the remote switching unit whether a relayed switching control signal is a "switch-on" or "switch-off" command, and in which other code detail of the encoding of the switching control signals is a user-selectable code to circumvent interference with other nearby remote switching units.

3. The system of claim 1 wherein the control unit is configured to plug into both the switched and unswitched AC receptacles located closely adjacent to one another in a switched outlet box, wherein the AC power to the switched AC receptacle is controlled by the switch whose function is being extended, and continuous AC power present at the unswitched AC receptacle provides power for the control unit, and wherein the encoded switching control signals are relayed by way of the unswitched AC power line to the companion remote switching unit.

4. The system of claim 2 wherein the control unit is configured to plug into both a switched and unswitched AC receptacles located closely adjacent to one another in the switched outlet box, wherein the AC power to the switched AC receptacle is controlled by the switch whose function is being extended, and continuous AC power present at the unswitched AC receptacle provides power for the control unit, and wherein the encoded switching control signals are relayed by way of the unswitched AC power line to the companion remote switching unit.

5. The system of claim 1 wherein the control unit is configured to plug into both a switched and unswitched AC receptacles located closely adjacent to one another in the switched outlet box, wherein the AC power to the switched AC receptacle is controlled by the switch whose function is being extended, and continuous AC power present at the unswitched AC receptacle provides power for the control unit, and wherein encoded switching control signals are relayed as modulation on an RF carrier by way of a low power RF link to the remote switching unit.

6. The system of claim 2 wherein the control unit is configured to plug into both the switched and unswitched AC receptacles located closely adjacent to one another in a switched outlet box, wherein the AC power to the switched AC receptacle is controlled by the switch whose function is being extended, and continuous AC power present at the unswitched AC receptacle provides power for the control unit, and wherein the encoded switching control signals are relayed as modulation on an RF carrier by way of a low power RE link to the remote switching unit.

7. The system of claim 1 wherein the control unit is plugged only into the switched AC receptacle that is controlled by the switch whose function is being extended, and in which the encoded switching control signals are modulated onto an RF carrier for wireless relay to the remote switching unit, and wherein power for the control unit is provided from the switched AC receptacle when switched on, and from energy stored in a storage capacitor for a short-duration interval required to generate and transmit the encoded "switch-off" switching control signal at the time the switch controlling that switched AC receptacle is turned off.

8. The system of claim 2 wherein the control unit is plugged only into the switched AC receptacle that is controlled by the switch whose function is being extended, and in which the encoded switching control signals are modulated onto an RF carrier for wireless relay to the remote switching unit, and wherein power for the control unit is provided from the switched AC receptacle when switched on, and from energy stored in a storage capacitor for a short-duration interval required to generate and transmit the encoded "switch-off" switching control signal at the time the switch controlling that switched AC receptacle is turned off.

9. The system of claim 1 wherein the remote switching unit is plugged into a remote AC outlet receptacle and derives power therefrom, and receives, demodulates, and decodes the encoded switching control signals relayed from the control unit by way of the AC line, and, in response to the relayed switching control signals, correspondingly energizes or de-energizes an integral AC outlet receptacle into which the switchable device to be controlled can be plugged.

10. The system of claim 1 wherein the remote switching unit is plugged into a remote AC outlet receptacle, and derives power therefrom, and comprises an RF receiver to receive, demodulate and decode the encoded switching control signals relayed by way of a low power RF link from the control unit, and in response to the relayed encoded switching control signals, correspondingly energizes or de-energizes an integral AC outlet receptacle into which the switchable device to be controlled can be plugged.

11. The system of claim 9 wherein the remote switching unit incorporates a decoder that unambiguously identifies "switch-on" and "switch-off" encoded commands so as to correspondingly energize or de-energize the integral AC outlet receptacle into which the switchable device to be controlled can be plugged.

12. The system of claim 10 wherein the remote switching unit incorporates a decoder that unambiguously identifies "switch-on" and "switch-off" encoded commands so as to correspondingly energize or de-energize the integral AC outlet receptacle into which the switchable device to be controlled can be plugged.

13. The system of claim 9 wherein the remote switching unit incorporates a decoder that includes means for user-setting of the user-selectable code so as to match the user code selected for the control unit.

14. The system of claim 10 wherein the remote switching unit incorporates a decoder that includes means for user-setting of the user-selectable code so as to match the user code selected for the control unit.

15. The system of claim 11 wherein the remote switching unit decoder includes means for user-setting of the user-selectable code so as to match the user code selected for the control unit.

16. The system of claim 12 wherein the remote switching unit decoder includes means for user-setting of the user-selectable code so as to match the user code selected for the control unit.

* * * * *